United States Patent [19]

Rao et al.

[11] Patent Number: 4,489,601
[45] Date of Patent: Dec. 25, 1984

[54] APPARATUS AND METHOD OF MEASURING THE LEVEL OF A LIQUID

[75] Inventors: B. Rama Rao, Lexington; Kenneth W. Robbins, Wilmington, both of Mass.

[73] Assignee: Sperry Corporation, New York, N.Y.

[21] Appl. No.: 514,743

[22] Filed: Jul. 18, 1983

[51] Int. Cl.³ .............................................. G01F 23/28
[52] U.S. Cl. ................. 73/290 R; 73/304 R; 324/58.5 B
[58] Field of Search ................. 73/290 R; 324/58.5 B

[56] References Cited

U.S. PATENT DOCUMENTS

| | | | |
|---|---|---|---|
| 3,474,337 | 10/1969 | Petrick | 324/58.5 B |
| 3,703,829 | 11/1972 | Dougherty | 73/304 X |
| 3,832,900 | 9/1974 | Ross | 73/290 R |
| 3,874,237 | 4/1975 | Zwarts | 73/290 R |
| 3,995,212 | 11/1976 | Ross | 324/58.5 B |
| 4,359,902 | 11/1982 | Lawless | 73/290 R |

Primary Examiner—Daniel M. Yasich
Attorney, Agent, or Firm—Howard P. Terry; Martin G. Anderson

[57] ABSTRACT

An apparatus and method for measuring the height of a liquid above a reference level in which short pulses of subnanosecond duration are coupled to a dual-mode transmission line immersed in a liquid to propagate thereon in a plurality of modes. A surface wave propagating on the outer conductor is reflected from the surface of the liquid, and coaxial-mode propagating within the transmission line is reflected from the reference level. These reflected pulses propagate back along the transmission line, coupled to a receiver for detection, the detected pulses processed to determine the liquid height above a reference level.

6 Claims, 1 Drawing Figure

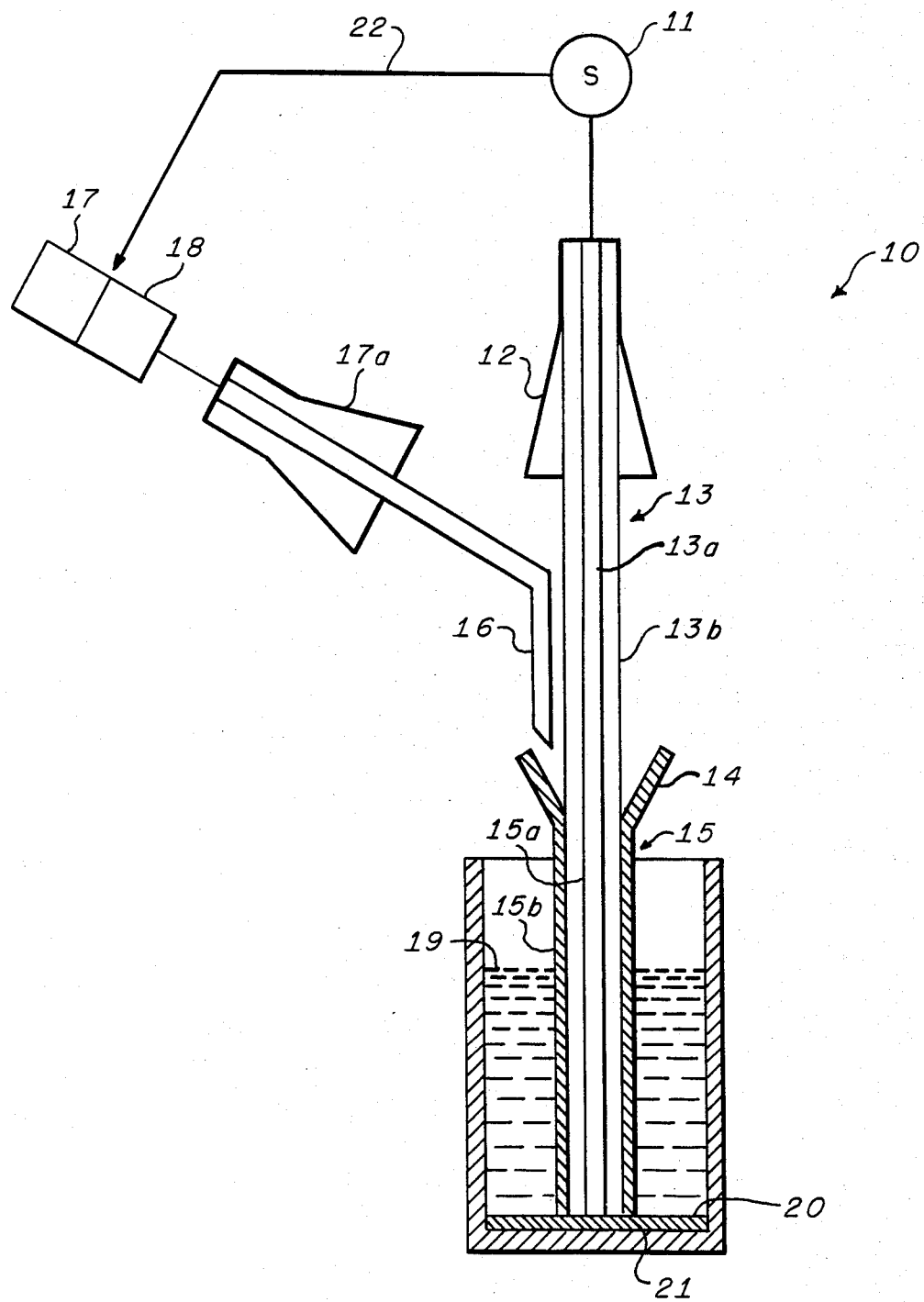

APPARATUS AND METHOD OF MEASURING THE LEVEL OF A LIQUID

BACKGROUND OF THE INVENTION

1. Field of the Invention

This invention pertains to an apparatus and method for determining the height of a liquid above a reference level.

2. Description of the Prior Art

Various techniques have been employed in the prior art to measure the level of a liquid or the interface levels between two or more liquids. Mechanical devices such as floats are not sufficiently accurate for most applications. Devices using sonic or ultrasonic signals become complex when used to measure the surface levels of contained liquids because of echoes received from the surfaces of the supporting container. A prior art liquid level detection system which overcomes the deficiencies of mechanical and sonic systems is disclosed in U.S. Pat. No. 3,832,900 issued Sept. 3, 1974 to G. F. Ross and assigned to the assignee of the present invention. This invention employs an open coaxial transmission line which is immersed in a liquid. The surface of the liquid creates a discontinuity in the coaxial line which produces reflections of the incident pulses that propagate back along the coaxial line. The time difference between the received reflected pulse and the transmitted pulse determines the liquid level. However, the open coaxial line tends to clog, and requires frequent cleaning. Another prior art liquid level detection system is disclosed in U.S. Pat. No. 3,995,212 issued Nov. 30, 1976 to G. F. Ross and also assigned to the assignee of the present invention. This invention utilizes a single wire transmission line, immersed in a liquid and overcomes the clogging problem. The prior art liquid level detection system utilizes reflected waves on a transmission line to provide an accurate liquid level measurement but suffers from being unable to measure the depth of electrically conductive liquids. The present invention overcomes this deficiency and provides an apparatus and method for measuring the level and depth of a liquid that may be either electrically conductive or non-conductive.

SUMMARY OF THE INVENTION

The subject invention provides an apparatus and a method for measuring the height of a liquid above a reference level. A Goubau transmission line extends from an input terminal to a junction with a hollow cylinder having a diameter that is greater than the outer diameter of the Goubau line. At this junction, the Goubau line extends into the hollow cylinder to form a coaxial transmission line. The coaxial line is immersed vertically in a liquid where it extends from above the surface of the liquid to some reference level below the surface, typically the bottom.

A pulse coupled to the Goubau line at the input terminal propagates as a surface wave until it reaches the junction where it is transformed into two modes: a surface wave mode on the outside of the coaxial line and a transverse electromagnetic (TEM) mode within the coaxial line. A transition device at the junction of the Goubau and coaxial lines, in the form of a cone, controls the relative power distributed to the two modes. A reflection occurs when the surface wave propagating on the outside of the coaxial line encounters the surface of the liquid. The TEM mode being entirely within the coaxial line is not reflected until a later time when it reaches the reference level below the surface. The reflected surface wave on the outside of the coaxial line and the reflected TEM mode wave within the coaxial line propagate back along the coaxial line, are coupled to the Goubau line, and propagate as reflected surface waves separated in time. The reflected surface waves propagating on the Goubau line are transferred to a directional coupler and detected by a receiver. The time between the received pulses is proportional to the distance from the surface of the liquid to the reference level.

BRIEF DESCRIPTION OF THE DRAWINGS

The sole FIGURE is a block diagram of the apparatus showing the dual-mode transmission line extending through a liquid.

DESCRIPTION OF THE PREFERRED EMBODIMENTS

In the FIGURE, a liquid level measuring apparatus 10 includes a subnanosecond pulse generator 11 coupled through a transition device 12 to a surface wave transmission line also known as a Goubau line 13. The transition device 12 may be a conical horn whose length and taper provide for the efficient launching of a surface wave along the Goubau line 13. The Goubau line 13 includes a conductor 13a coated with an insulator 13b. The Goubau line 13 is coupled to a coaxial transmission line 15 which extends vertically from above the surface of the liquid 19 to the bottom or reference level 20. The inner conductor 15a and outer conductor 15b of the coaxial line 15 are terminated to provide reflections. This termination may be a metal plate 21 at the reference level 20 to establish a short circuit termination.

Power distribution and coupling between the Goubau line 13 and the coaxial line 15 may be enhanced by a metal cone 14 coupled at its smaller diameter end to the outer conductor of the coaxial line 15. The length and taper of the metal cone 14 controls the relative amount of power that continues to propagate as a surface wave on the outer surface 15 of the coaxial line 15 and the power that propagates in a TEM mode within the coaxial line 15.

A surface wave directional coupler 16, is used for receiving and monitoring pulses reflected from the surface of the liquid 19 and from the bottom 20. The directional coupler 16 placed in close physical proximity to the Goubau line 13 is matched to a receiver 17 through a transfer device 17a which may be a cone. The receiver 17 may be one of many well known in the art, as for example, a Hewlett Packard 1811A Sampling Time Base and Vertical Amplifier. The display scope 18 may also be of the type generally known such as a Hewlett Packard 183A oscilloscope. The subnanosecond pulse generator 11 may be a type generally known in the art. For example, such a device for producing very short electro-magnetic pulses is described In U.S. Pat. No. 3,832,568 issued to C. C. Wang, Aug. 27, 1974, assigned to the assignee of the present invention.

In the FIGURE, the subnanosecond pulse generator 11 produces pulses that propagate along the Goubau line 13 as surface waves. Upon reaching the transition device 14, the surface wave in the Goubau mode is coupled to the coaxial line 15 and continues to propagate as a surface wave on the outside conductor 15b of the coaxial line 15 and as a TEM mode within the coaxial line 15. The surface wave propagating on the outside of the coaxial line 15b is reflected from the surface of the liquid 19 due to the discontinuity created by the air liquid interface. The wave reflected from the surface of the liquid 19 propagates back along the outside of the coaxial transmission line 15b. The wave propagating within the coaxial line 15 is reflected from the bottom 20 and propagates back within the coaxial line 15 in a TEM mode. The reflected waves travelling on the surface 15b and within the coaxial line 15 are transferred through the transition device 14 to the Goubau line 13 and propagate back along the Goubau line 13 as surface waves. The reflected waves on the Goubau line 13 are transferred by the surface wave directional coupler 16 to the receiver 17 through transition device 17a. The reflected waves after being detected by receiver 17 may be visually presented on the display scope 18 as a function of the distance from the surface of the liquid 19 to the reference level.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. An apparatus for measuring the height of a liquid in a container above a reference level comprising,
    first transmission line means coupled to receive short pulses for propagation in a first mode,
    second transmission line means coupled at a first end to said first transmission line, and coupled to signal reflecting means at a second end at the bottom of the container, said second transmission line means having an inner conductor and an outer conductor with inner and outer surfaces, for propagating pulsed signals therealong, means for launching short pulses in a second mode between said inner conductor and said inner surface of said outer conductor and for launching short pulses in said first mode to said outer surface of said outer conductor whereby:
    pulses in said first mode propagating on said outer surface of said outer conductor are reflected from said surface of said liquid and short pulses in said second mode propagating between said inner conductor and said inner surface of said outer conductor are reflected from said signal reflecting means,
    means for coupling said first mode reflected pulses and said second mode reflected pulses from said second transmission line means to said first transmission line means in said first mode for propagation therealong,
    receiver means coupled to said first transmission line for detecting said reflected pulses and for determining said liquid level therefrom.

2. An apparatus for measuring the height of a liquid above a reference level as recited in claim 1, wherein said receiver means includes a directional coupler responsive to said reflected short pulses in first mode.

3. An apparatus for measuring the height of a liquid above a reference level as recited in claim 1 in which said first transmission line means includes a Goubau line and said second transmission line means includes a coaxial line.

4. An apparatus for measuring the height of a liquid above a reference level as recited in claim 1 in which the said means for launching pulses in a second mode include a conical horn having a first circular end electrically coupled to said outer conductor and conically flared therefrom to a second circular end about said first transmission line means for controlling power distribution between said first and said second modes.

5. An apparatus for measuring the height of a liquid above a reference level as recited in claim 1 further including a plate coupled to an end of said second transmission line at said reference level for insuring an adequate amplitude of said reflected pulse in said first mode and said second mode.

6. A method for determining the height of a liquid above a reference level comprising the steps of:
    exciting a first transmission line in said liquid with pulses of subnanosecond duration in a first mode,
    propagating pulses in said first mode along said first transmission line, coupling said pulses in first mode to an integrally coupled coaxial second transmission line in a plurality of modes whereby;
    said first mode propagates on said outer surface of said outer conductor of said second transmission line and a second mode propagates between said inner conductor and said inner surface of said outer conductor of said second transmission line,
    coupling reflected pulses from said surface of said liquid in said first mode and reflected pulses from said reference level in said second mode from said second transmission line to said first transmission line in a first mode,
    coupling reflected first mode pulses fom said first transmission line to a receiver means,
    detecting reflected first mode pulses with said receiver means, where said reflected pulses from said liquid surface and said reference level are separated in time proportional to said height of said liquid above said reference level.

* * * * *